Jan. 30, 1951 R. G. KRUEGER ET AL 2,539,630
SLIP CLUTCH
Filed Jan. 12, 1946
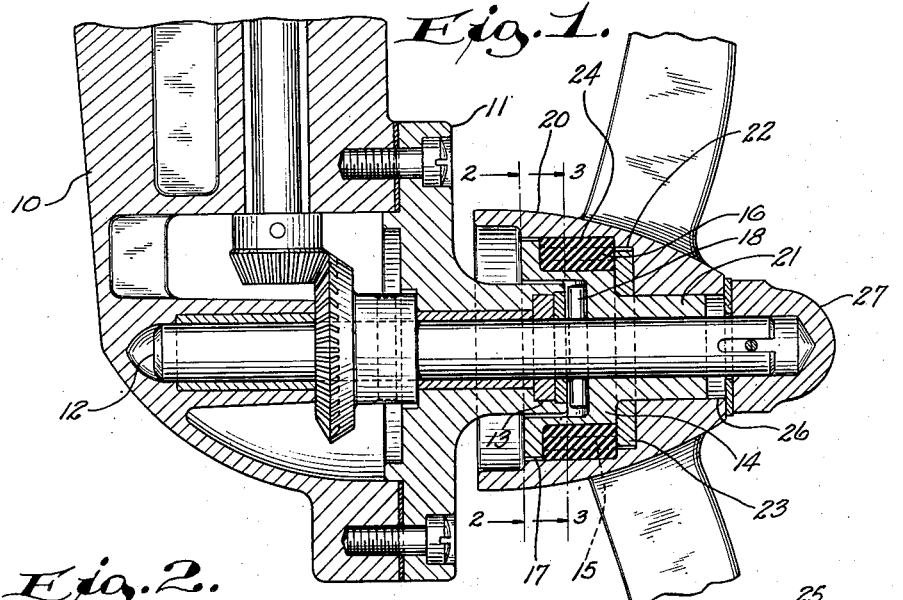
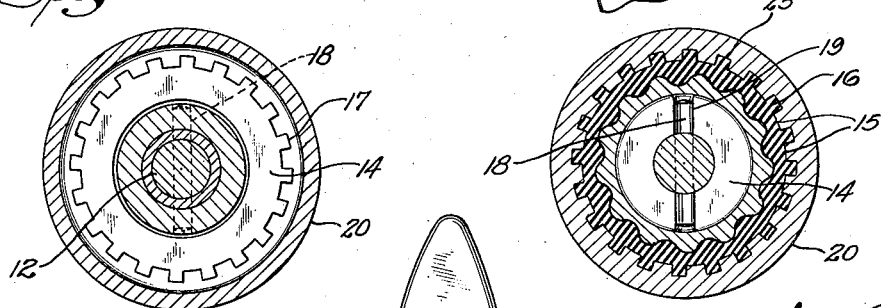
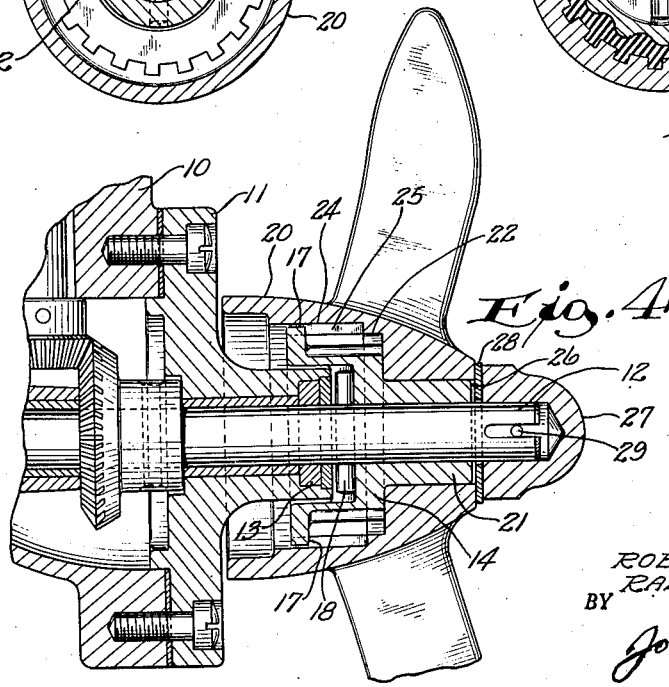
INVENTOR.
ROBERT G. KRUEGER
RALPH N. KIRCHER
BY John W. Michael
ATTORNEY.

Patented Jan. 30, 1951

2,539,630

UNITED STATES PATENT OFFICE 2,539,630

SLIP CLUTCH

Robert G. Krueger, Milwaukee, and Ralph N. Kircher, West Bend, Wis., assignors to West Bend Aluminum Company, West Bend, Wis., a corporation of Wisconsin Application January 12, 1946, Serial No. 640,769

4 Claims. (Cl. 64—28)

This invention relates to slip clutches or flexible couplings, particularly the type used for driving propellers.

In devices of this type, a resilient member of rubber-like material engages both the driving and driven elements and permits slippage therebetween when the torque load becomes excessive. However, if such slippage occurs too frequently or is of too long duration, the resilient material becomes permanently distorted, worn, or destroyed and will not restore motion to both elements after the excessive torque load has been removed. This condition cannot be remedied except by replacement of the resilient member.

It is the object of this invention, therefore, to provide a slip clutch which permits the driving and driven elements to be inter-engaged for direct driving relationship whenever the resilient member fails to perform its function under normal torque load.

This object is accomplished by providing a set of teeth or the like in the driving or driven element which will interfit with a similar set of teeth or the like in other of such elements whenever those elements are moved axially relative to each other. Such axial movement is controlled by the removal of a spacing member such as a washer. Whenever the resilient member becomes ineffective to transmit normal torque force, it may be removed along with the spacing member and the elements shifted axially relative to each other to the position where the teeth are in driving engagement.

This invention has utilization in any number of applications for slip clutches. It has particular utilization in slip clutches used with propellers for outboard motors. Very often the resilient member of these clutches breaks down at times when it is dangerous and inconvenient for the user to be without propelling power. By a very simple expedient, driving power may be temporarily restored to propeller without the necessity of replacement parts.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a sectional view of the underwater portion of an outboard motor having a slip clutch, between the driving element and the driven propeller, embodying the present invention;

Figure 2 is a sectional view taken on the line 2—2 of Figure 1;

Figure 3 is a sectional view taken on the line 3—3 of Figure 1; and

Figure 4 is a sectional view of the device viewed in Figure 1 with the resilient member and spacing washer of the slip clutch removed and the propeller moved axially into direct interengaging relationship with the driving element.

Referring to the drawings by reference numerals, the clutch is shown embodied in the underwater leg of an outboard motor. The gear housing 10 and gear housing cover 11 rotatably support the propeller driving shaft 12 in a manner well known to those skilled in the art. The shaft 12 protrudes rearwardly from the cover 11, and there are present the customary washers and water seals, designated generally at 13, which act as a stuffing box for the shaft 12. A propeller driving member 14 has a central bore which permits it to slip over the end of the shaft 12. The member 14 has an intermediate outer peripheral surface formed with undulations 15. These undulations are pressed into the central opening of a resilient member 16 and form a driving connection between member 16 and member 14 which will not slip under normal torque transmission requirements. The member 14 also has at its forward end (the left as viewed in Figures 1 and 4) a peripheral flange, the outer surface of which is provided with a series of teeth 17 (see Figure 2) which interengage with teeth formed on the hub of the propeller to provide a direct drive when required. The member 14, at its rearward end, is provided with a portion forming an axle 21 for the propeller.

A shear pin 18 carried by the shaft 12 rests in a slot 19 formed in the member 14 to provide a driving connection between the shaft 12 and said member.

The hub 20 of the propeller has a bore 26 which rotatably fits on the axle 21 to support the propeller. The hub 20 is also provided with a counter-bore 22 immediately adjacent the bore 26. The counter-bore 22 receives a spacing washer 23 which prevents the hub from moving axially on the axle 21 far enough to the left to permit engagement between teeth 17 and the teeth on the hub 20. Adjacent the counter-bore 22 is another counter-bore 24 the inner surface of which is provided with a series of teeth 25. The teeth 25 terminate short of the forward (left-hand) end of the counter-bore 24 to provide operating space in the counter-bore 24 for the teeth 17 to permit free angular movement between teeth 17 and teeth 25. The teeth 25, of course, engage the outer surface of the resilient member 16, to form a non-slip torque transmission connection therebetween. The hub 20 is held on the axle 21 by the usual cap nut 27 threaded on the shaft 12 and retained in position by a cotter pin 29. A washer 28 may be interposed between the nut and the end of the hub 20.

As shown in Figure 1, the spacing washer 23 maintains the hub 20 spaced axially to the rear (right as viewed in Figure 1) of the propeller to prevent the teeth 17 from having engagement with the teeth 25. In this position the resilient element 16 transmits normal torque from the member 14 to the hub 20. If for some reason the propeller should become snared and require more than the normal predetermined torque to turn it, then a slippage occurs between the member 14 and the resilient member 16. This slippage will avoid the breakage of the shear pin 18 and of the propeller. However, if slippage occurs too frequently or endures for too long a period of time, the member 16 becomes so worn, distorted or chewed-up that it will no longer engage the undulations 15 tightly enough to cause a transmittal of normal torque from the member 14 to the resilient member 16. When such a condition occurs, it is only necessary to remove the cap nut 27 and the propeller hub 20, take out the resilient member 16 and the spacing washer 23, and then reassemble the propeller hub 20 on the axle 21. In this reassembly, which is shown in Figure 4, the hub 20 is shifted axially forward (toward the left as viewed in the drawings). This causes the teeth 17 to become directly interengaged with the teeth 25, thus creating a positive drive between the member 14 and the hub 20. This positive drive is accomplished without the use of any replacement parts, such as the resilient member 16, and hence may be accomplished even though such replacement parts are not available at the time the condition arises.

The direct drive, of course, is a temporary expediency and as soon as possible the defective resilient member 16 should be replaced. However, the shear pin 18 provides some protection against damage to the propeller even during this temporary direct drive relationship.

Although only one embodiment of the invention is shown and described herein, it will be understood that this application is intended to cover such changes or modifications as come within the spirit of the invention or scope of the following claims.

We claim:

1. A slip clutch comprising a propeller shaft having thereon a propeller driving member, said member being provided with a series of undulations adapted to engage the inner surface of a resilient member, a shear pin carried by said shaft and having a driving engagement with said propeller driving member, a propeller having a hub rotatably mounted on said propeller driving member, said hub having an inner periphery provided with teeth adapted to engage the outer surface of a resilient member, a resilient member mounted between said teeth and said undulations to transmit torque from said member to said hub, said member having a peripheral portion provided with teeth adapted to engage with the teeth in said hub when said member and hub are moved axially into alinement, and a spacer interposed between said member and said hub to maintain the teeth on said hub spaced from the teeth on said member and out of driving engagement therewith.

2. A slip clutch comprising a driving element having formed thereon a series of undulations and a hub-carrying axle, a propeller including a hub having a portion rotatably mounted on said axle, a series of teeth formed on the interior portion of said hub, a resilient member in close contact with said undulations and said teeth to transmit normal torque between said element and said hub, and a series of teeth on said element in alinement with the teeth on said hub and engageable therewith upon lateral movement of said hub relative to said element.

3. A slip clutch comprising a driving element having formed thereon a series of undulations and a hub-carrying axle, a propeller including a hub having a portion rotatably mounted on said axle, a series of teeth formed on the interior portion of said hub, a resilient member in close contact with said undulations and said teeth to transmit normal torque between said element and said hub, a series of teeth on said element in alinement with the teeth on said hub and engageable therewith upon lateral movement of said hub relative to said element, and a spacing member interposed between said hub and said element to maintain the teeth on said hub laterally spaced from the teeth on said element.

4. A slip clutch comprising a driving element having a surface provided with means for making a driving connection with a resilient member which will not slip under normal torque transmission requirements but will slip when more than normal torque is applied, a resilient member mounted on said surface and interconnected with teeth on a driven element, teeth on said driving element adjacent said surface, said teeth being free of driving connection with said resilient member and adapted to interengage with teeth on a driven element, a driven element provided with teeth interconnected with said resilient member to provide non-slip torque transmission therebetween, said teeth in the normal relationship of said driving and driven elements being spaced from the teeth on said driving element, a non-resilient member normally interposed between said driving and driven elements to maintain the teeth on said elements spaced, said non-resilient member being removable to permit said elements to move together and the teeth thereof to interengage and form a non-slip connection between said driving and driven element, and adjustable means for holding said elements in both normal relationship with said teeth spaced and in positive drive relationship with said teeth interconnected.

ROBERT G. KRUEGER.
RALPH N. KIRCHER.

REFERENCES CITED

The following references are of record in the file of this patent:

UNITED STATES PATENTS

| Number | Name | Date |
|---|---|---|
| 2,070,329 | Brecht | Feb. 9, 1937 |
| 2,146,764 | Ricefield | Feb. 14, 1939 |